United States Patent
Elsener

(10) Patent No.: US 8,528,215 B2
(45) Date of Patent: Sep. 10, 2013

(54) POCKET TOOL, IN PARTICULAR A POCKET KNIFE

(75) Inventor: Carl Elsener, Ibach (CH)

(73) Assignee: Victorinox AG, Ibach (CH)

( * ) Notice: Subject to any disclaimer, the term of this patent is extended or adjusted under 35 U.S.C. 154(b) by 547 days.

(21) Appl. No.: 11/975,154

(22) Filed: Oct. 18, 2007

(65) Prior Publication Data
US 2008/0086822 A1    Apr. 17, 2008

(51) Int. Cl.
*B26B 1/04* (2006.01)
(52) U.S. Cl.
USPC .............................. 30/157; 30/161
(58) Field of Classification Search
USPC .................. 30/153, 154, 155, 156, 157, 158, 30/160, 161, 162, 163, 355; 7/119, 118
See application file for complete search history.

(56) References Cited

U.S. PATENT DOCUMENTS

| | | | | |
|---|---|---|---|---|
| 416,946 | A * | 12/1889 | Pilcher | 30/157 |
| 586,453 | A | 7/1897 | Normand | |
| 991,316 | A * | 5/1911 | Johnson | 7/168 |
| 1,049,931 | A * | 1/1913 | Smith | 30/157 |
| 1,056,081 | A * | 3/1913 | Yerzley | 30/155 |
| 2,352,013 | A | 6/1944 | Roth | |
| 4,669,188 | A * | 6/1987 | Evrell | 30/161 |
| 4,837,932 | A * | 6/1989 | Elsener | 30/161 |
| 5,025,557 | A * | 6/1991 | Perreault | 30/151 |
| 5,027,512 | A | 7/1991 | Andrews | |
| 5,581,834 | A * | 12/1996 | Collins | 7/118 |
| 6,848,184 | B2 * | 2/2005 | Cheng | 30/155 |

FOREIGN PATENT DOCUMENTS

| | | |
|---|---|---|
| AT | 500097 | 10/2005 |
| DE | 290359 | 1/1914 |
| DE | 3528105 | 2/1987 |
| EP | 0619167 | * 10/1994 |
| EP | 1000713 | 5/2000 |

OTHER PUBLICATIONS

International Search Report for PCT/IB2007/004615, dated Jun. 2, 2009.
International Search Report and Written Opinion of the International Search Authority for International Patent Application No. PCT/IB2007/004615, dated Apr. 20, 2009.

* cited by examiner

*Primary Examiner* — Laura M. Lee
(74) *Attorney, Agent, or Firm* — Edwards Wildman Palmer LLP; David Weild, III

(57) ABSTRACT

The invention relates to a pocket tool with a housing, a compartment region, pins (11a, 11b) and an implement (13) interchangeably mounted on one of the pins (11a, 11b) by means of a coupling mechanism (22) and which can be moved by means of a pivot bearing (18) between an inwardly pivoted transport position and an outwardly pivoted functional position, which is mounted against a spring element and can be moved relative to the pin (11a, 11b) into an uncoupling position and removed from the pocket tool. The coupling mechanism (22) has a guide track guiding the implement (13) in the uncoupling position at an angle with respect to a longitudinal axis (68) of the housing (2) during its uncoupling movement along the compartment region. The housing has oppositely lying side walls, which respectively have convex gripping cams (59) on their top face projecting out beyond the external contour of the implement (13, 14, 5) when moved into the transport position and disposed symmetrically about the longitudinal axis (68) of the housing (2), the geometry of which is dimensioned so that in the uncoupling position, a part-length of the implement (13) lies within the compartment region and is covered by the side walls.

8 Claims, 6 Drawing Sheets

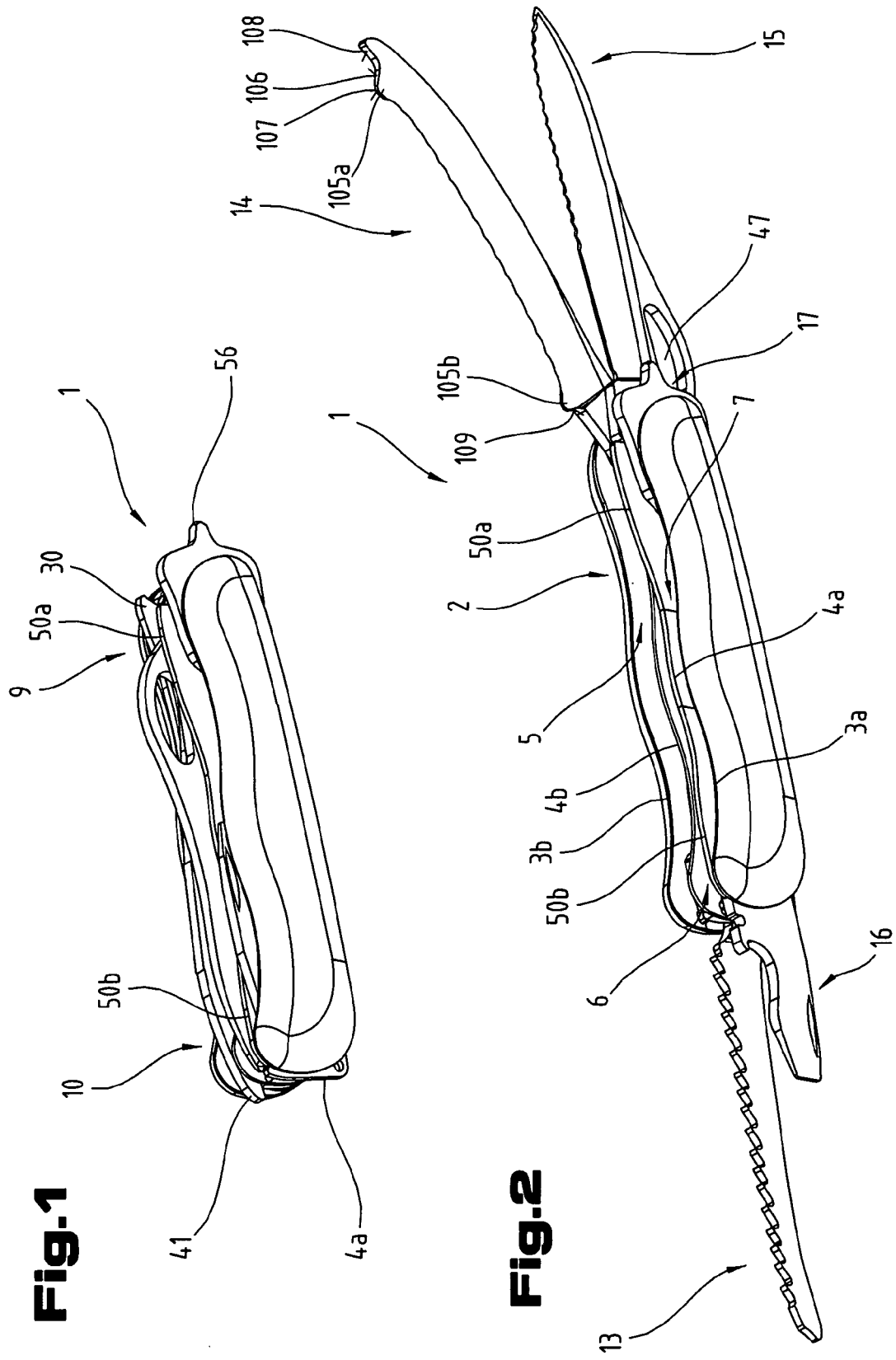

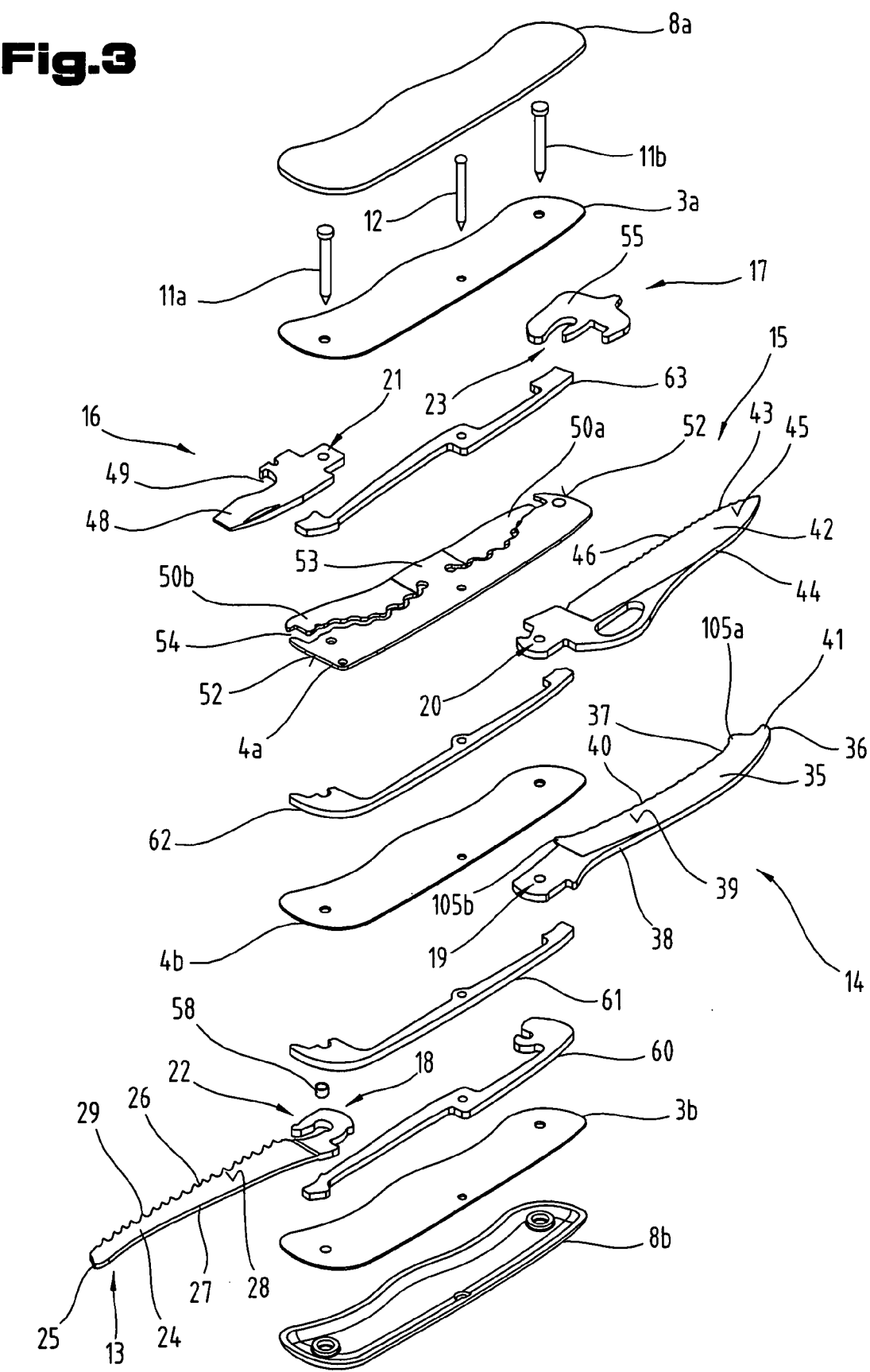

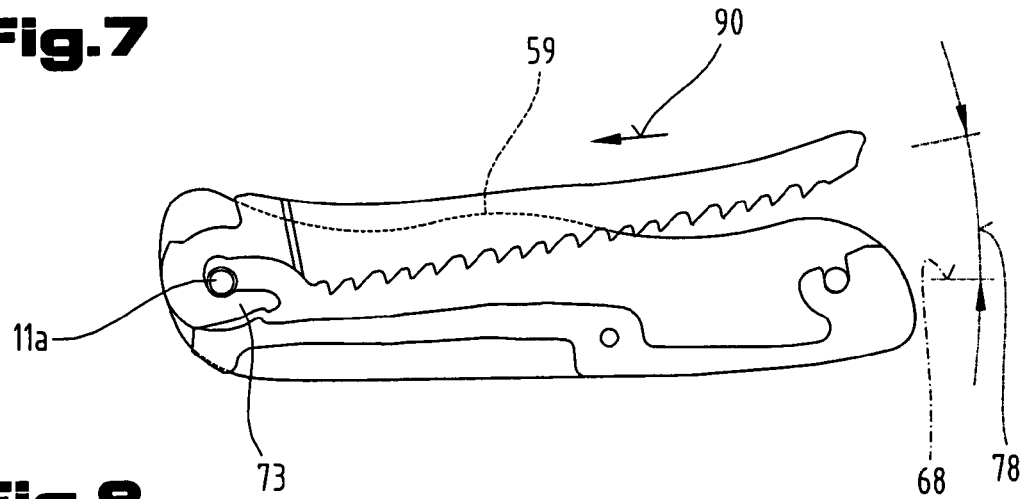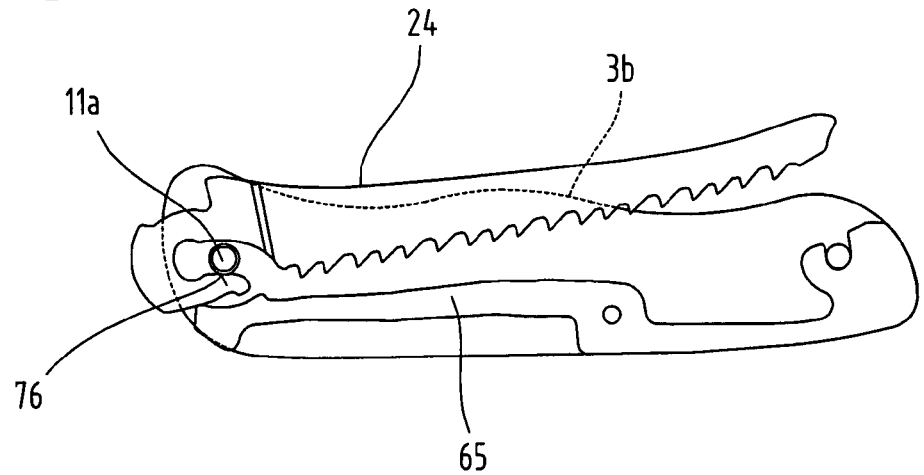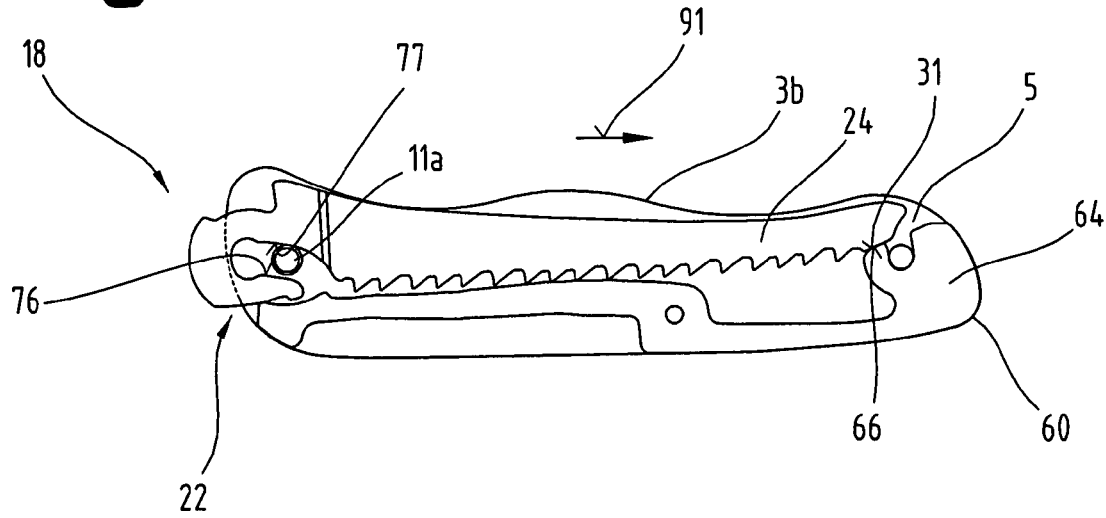

POCKET TOOL, IN PARTICULAR A POCKET KNIFE

CROSS REFERENCE TO RELATED APPLICATIONS

Applicant claims priority, under 35 U.S.C. §120, to International Application No. PCT/IB2007/004615 filed on Dec. 14, 2007, which claims priority to Austrian Patent Application No. A1722/2006 filed on Oct. 16, 2006, and to Austrian Patent Application No. A 1732/2006 filed on Oct. 17, 2006. Each of the above-cited application is incorporated herein by reference. Applicant also claims priority under 35 U.S.C. §119 to AUSTRIAN Patent Application No. A1722/2006 filed on 16 Oct., 2006 and to AUSTRIAN Patent Application No. A 1732/2006 filed on 17 Oct., 2006.

BACKGROUND OF THE INVENTION

1. Field of the Invention

The invention relates to a pocket tool and a cutting tool.

2. Prior Art

Patent specification U.S. Pat. No. 6,675,419 B2 discloses a pocket tool comprising handles connected to one another by means of a pivot joint, with side walls joined via pins and compartment regions disposed between them, having implements which are mounted on the pins by means of pivot bearings so that they can be moved between a transport position pivoted into the compartment region and a functional position pivoted out of the compartment region. One of these implements is provided in the form of tweezers, which are disposed on a pin so that they can be removed via a coupling mechanism and are mounted against a spring element. The coupling mechanism has guide arms and a recess disposed between them for accommodating the pin. In order to remove the tweezers, they are pivoted out of the transport position by 180° into an uncoupling position corresponding to the functional position, in which the tweezers can be pushed relative to the pin, parallel with the longitudinal extension of the handle, into the housing until one of the guide arms is released from the pin. Instead of tweezers, a knife blade or a saw blade may also be fitted with a coupling mechanism. During the process of changing an implement, therefore, the sharp-edged blade is exposed, thereby posing an increased risk of injury to the user. As there is no lateral guide for the implement in the releasing position, there is no way of ruling out damage to the implement in the event of incorrect usage.

Patent specification AT 500 097 A1 discloses a pocket tool, in which an electronic module is mounted by means of a coupling mechanism on a pin comprising a bearing part and a locking arm which is mounted against the pin and holds the pin in the bearing part. During both the uncoupling and coupling operation, the electronic module is pivoted relative to the housing until a longitudinal axis of the electronic module is oriented at an angle of 90° with respect to the longitudinal axis of the housing.

Patent specifications US 416,946 A, DE 290 359 C, US 586,453 A, US 19,606 A and U.S. Pat. No. 1,049,931 A disclose pocket tools with an implement which can be replaced by means of a coupling mechanism mounted on a pin of the housing and which can be moved by means of a pivot bearing between a transport position pivoted into the housing and a functional position pivoted out of the housing.

SUMMARY OF THE INVENTION

The underlying objective of this invention is to propose a pocket tool which allows an implement to be replaced easily and without any major risk of injury.

This objective is achieved by the invention on the basis of the characterising features defined in this disclosure. The advantage of this approach is that the implement is moved at such an angle with respect to the longitudinal axis of the housing, due to the sliding guide action during the replacement operation, in particular the uncoupling operation, that the gap between a functional surface, in particular the blade of a knife or the saw teeth of a saw, and the external contour of the housing is smaller than a finger cross-section of the user, and even if the user accidentally slips on the top edge of the implement during the replacement operation, the finger tips are able to slide on the "non-dangerous" side face of the implement and on the housing and do not come into contact with the functional surface. During the changeover operation, the implement is also guided laterally along the compartment region by the housing itself or by the housing and another implement, so that even in the event of higher releasing forces, any damage to the implement, such as deformation for example, is avoided. Gripping cams not only improve the ergonomic aspects and make the pocket tool easy to hold, but also act as a protective mechanism by means of which the active region of the blade or blades is partially covered when the implement is being pivoted out into the uncoupled position.

In another exemplary embodiment of the invention, the guide arms form a fork-type seating, by means of which the implement can be fitted on the pin and released from the pin particularly easily.

In another exemplary embodiment, the implement is moved relative to the pin across the guide track on the second guide arm in a controlled manner within the compartment region during the changeover operation, in particular the coupling operation, and is always held relatively close to and parallel with the longitudinal axis of the housing. This prevents the user from coming into contact with the functional surface of the implement during the coupling operation and thus rules out injury to the user's fingers.

In another exemplary embodiment, a retaining force exerted by a spring element acts on the implement both in the transport position and in the functional position, which ensures that one of the bearing parts is always located on the pin in both end positions.

In another exemplary embodiment, the implement is retained on the pin so that it can pivot in the coupling position and is prevented from working loose of its own accord. This reliably ensures that the interchangeable implement can not be lost.

The implement may also be reliably locked in the coupling position in another exemplary embodiment.

In another exemplary embodiment of the invention, both in the transport position and in the functional position, a catch on the spring element latches in co-operating catch recesses in the implement and the pivot bearing lies with one of its guide track parts against the support cam, thereby affording strong retaining forces, in particular in the functional position, and the implement is reliably prevented from inadvertently being folded back into the transport position whilst it is in use.

In another exemplary embodiment, a clean outward and inward pivoting movement of the implement relative to the spring element is achieved in co-operation with the guide link on the spring element and the individual guide track parts.

High cutting forces can be absorbed by the implement as a result of the design described in this disclosure.

In another exemplary embodiment, in the outwardly pivoted functional position, the implements may be additionally locked by means of the locking tabs integrally formed from the dividing wall due to a positive fit with the pivot bearing if necessary, in addition to spring elements, which means that even if high forces or moments prevail during use, the implements are prevented from undesirably folding back into the transport position. Accordingly, an implement can not be pivoted back into the transport position in a controlled manner until the locking tab releases the implement, thereby reliably preventing injuries to the user caused by the implement unexpectedly folding back in.

In another exemplary embodiment, the implement can be pushed relative to the pin by the guide track by expending only a small amount of force and reliably latches on the pin by means of its bearing part in the coupling position under the effect of the spring force. Due to the comfortable changeover operation requiring less force to be applied, there is also very little risk of the user injuring himself.

Additionally, the coupling movement of the implement relative to the pin may advantageously be converted into a pivoting movement.

The implement may also be used as a breaking means, for example for breaking a window of a motor vehicle for rescue purposes.

Another objective of this invention is to propose a cutting tool, the blade of which remains fit for use for a long time and permits manipulation without any major risk of injury.

The blunt cams afford a means of protection between these extending blades. The rear cam also acts as a support surface and gripping surface, which protects the user of the pocket tool against injuries, in particular cuts, if he accidentally slips off the housing serving as a handle when using the cutting tool.

In another exemplary embodiment, the front cam assumes a guiding function for an object which has to be cut and even an object such as a tightly strapped seat belt can be cut without causing additional injury to the passenger.

BRIEF DESCRIPTION OF THE DRAWINGS

The invention will be described in more detail below with reference to examples of embodiments illustrated in the appended drawings. Of these:

FIG. 1 is a simplified diagram showing a perspective view of the pocket tool proposed by the invention with the implements pivoted into the transport position inside the compartment regions;

FIG. 2 shows the tool illustrated in FIG. 1 with the implements pivoted into the functional position outside the compartment regions;

FIG. 3 is an exploded diagram of the pocket tool illustrated in FIG. 1;

FIG. 7 is a side view of the implement illustrated in FIG. 4 in the outwardly pivoted uncoupling position with some parts outside the compartment region and the spring element;

FIG. 8 shows the process of uncoupling the implement from the pin;

FIG. 10 illustrates the operation of coupling the implement on the pin;

DETAILED DESCRIPTION OF PREFERRED EMBODIMENTS

Figure 4:
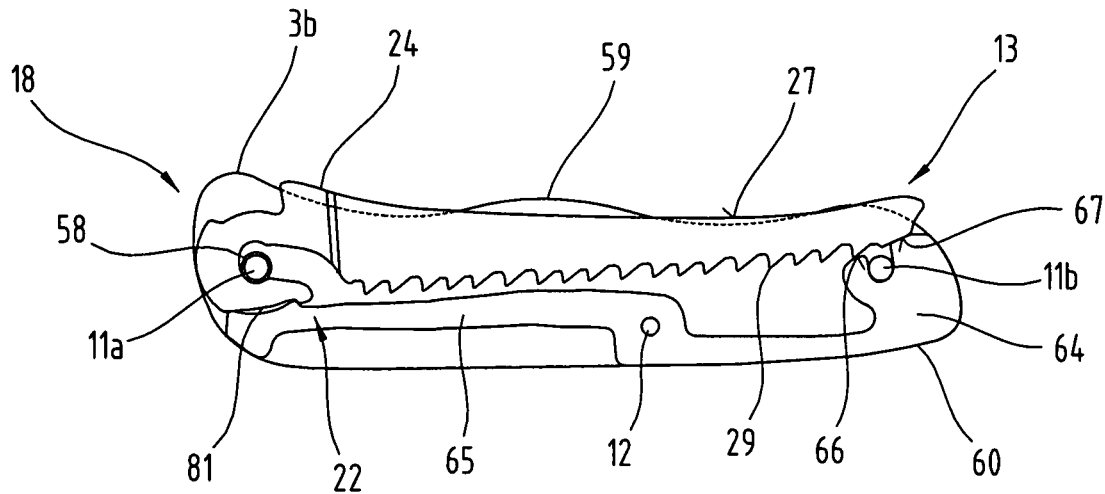
FIG. 4 is a side view showing an implement pivoted into the transport position and in the coupling position and the spring element co-operating with it.

Firstly, it should be pointed out that the same parts described in the different embodiments are denoted by the same reference numbers and the same component names and the disclosures made throughout the description can be transposed in terms of meaning to same parts bearing the same reference numbers or same component names.

FIGS. 1 to 3 illustrate a pocket tool 1 proposed by the invention. In this embodiment, it is a pocket knife and comprises a housing 2 with side walls 3a, 3b lying opposite one another, dividing walls 4a, 4b disposed between them and, at least partially bounded by the latter, compartment regions 5, 6, 7 lying next to one another in several planes. The side walls 3a, 3b are respectively covered with a shell 8a, 8b on their external faces, preferably made from plastic. The side and dividing walls 3a, 3b, 4a, 4b are connected by means of pins 11a, 11b disposed in end regions 9, 10 of the housing 2 and are optionally connected to one another by means of a pin 12 disposed between the latter, so that the compartment regions 5, 6, 7 are formed in between.

As may be seen from the drawings, the pocket tool 1 incorporates different implements 13 to 17, of which implements 13 to 16 each have a pivot bearing 18 to 21 by means of which each implement 13 to 16 can be moved between an inwardly pivoted transport position in the compartment region 5, 6, 7, as illustrated in FIG. 1, and a functional position pivoted out of the compartment region 5, 6, 7, as illustrated in FIG. 2, and is mounted on the pins 11a, 11b. As will be explained in more detail below, the implements 13, 17 are respectively mounted on the pin 11a, 11b by means of a coupling mechanism 22, 23 so that they can be changed. The advantage of this is that these implements 13, 17 can be replaced by implements fulfilling a different function or can be replaced with new implements in the event of wear.

The pocket tool 1 illustrated in the drawings is primarily used for rescuing passengers from a motor vehicle after an accident and the implements 13 to 17 are therefore designed for this purpose.

Implement 13 is provided in the form of a cutting tool and comprises a saw blade 24, by means of which composite glass such as a side window of a motor vehicle, for example, can be broken in or to provide access to injured passengers. The cutting tool has the pivot bearing 18, a bottom and top edge 26, 27 extending from it to a tip 25, as well as side faces 28 extending between the latter, and the bottom edge 26 is provided with a plurality of blades 29 or saw teeth disposed one after the other. The bottom and top edge 26, 27 taper, the farther they are away from the pivot bearing 18, in the direction of the tip 25 and at least the top edge 27 is of a concave design. At its tip 25, the saw blade 24 is provided with a grip element 30, which projects out from the external contour of the housing 2 in the inwardly pivoted transport position, and with a guide and abutment surface 31 indicated in FIG. 6. The latter extends on the bottom edge 26 between the foremost blade 29 and the grip element 30. The pivot bearing 18 incorporating the coupling mechanism 22 will be described in more detail with reference to FIGS. 4 to 10.

Implement 14 is provided in the form of a belt cutter 35 for cutting a seat belt, comprising the pivot bearing 19 and, extending approximately parallel with one another as far as a tip 36, the bottom and top edges 37, 38 as well as congruent side faces 39 extending between the latter. Disposed in the region where a side face 39 merges with the bottom edge 37 is a concave blade 40 in the form of a grinding edges. A grip element 41 is again provided at the tip 36, which extends out from the external contour of the housing 2 when the implement 14 is in the transport position. The grip element 41 projects so far out from the external contour that the implement 14 can also be pivoted into the functional position with a part of the body other than the finger tips, for example with the knee, thereby permitting one-handed operation when pivoting the implement 14 into the transport position and into the functional position. At least the top edge 38 is of a convex design so as to ensure that the belt cutter 35 can also be inserted without injuring the passenger, even if the seat belt is tight. In the embodiment illustrated, the bottom edge 37 is also of a concave design.

Between the tip 36 and the blade 40 on the one hand and between the pivot bearing 19 and the blade 40 on the other hand, the implement 14 also has a front cam 105a extending out from the blade 40 and a rear cam 105b projecting out from the blade 40 in the region of the bottom edge 37. The front cam 105a forms a deflector surface 106 extending from the bottom edge 37 at an angle in the direction of the top edge 38 and a guide surface 107. The latter adjoins the blade 40. Extending between the tip 36 and the cam 105a is a support surface 108, and the deflector surface 106 and support surface 108 subtend an angle of between 90° and 130°, for example 110°, and a rounded region with a radius of, for example, between 2 mm and 6 mm is provided in the region where the deflector and support surfaces 106, 108 merge. The support surface 108 and a longitudinal axis 68 of the housing 2 subtend an angle of between 10° and 30°, for example 15°, when the implement 14 is pivoted out into its functional position.

If it is necessary to cut through an object, in particular a seat belt, the tip 36 is pushed underneath the object to be severed and as this happens, the object is guided on the support surface 108 and then across the deflector surface 106 and lifted towards the guide surface 107, from where it slides off the blade 40 and is severed.

The front cam 105a therefore assumes a guiding function for the object if it has to be cut and even a tightly strapped seat belt can be cut without causing further injury to the passenger.

The rear cam 105b acts as a support surface or gripping surface 109 extending, preferably at an angle, from the bottom edge 37 in the direction of the top edge 38, which protects the user of the pocket tool 1 against injuries, in particular cuts, if he accidentally slips from the housing 2 serving as a handle when using the implement 14. The gripping surface 109 also provides support for a finger tip when using the implement 14. The blunt cams 105a, 105b also afford protection for the blade 40 extending between them.

Implement 15 is provided in the form of a knife blade 42 (cutting tool) and comprises the pivot bearing 20 and the bottom and top edges 43, 44 extending from the latter and converging towards a tip as well as congruent side faces 45 extending between the latter. Disposed in the region where a side face 45 merges with the bottom edge 43 is a blade 46 in the form of a grinding edge. At its top edge 44 in the transition region to the pivot bearing 20, the knife blade 42 is provided with an eye-type grip orifice 47 extending out beyond the blade contour. In terms of its dimensions, the grip orifice 47 is designed so that the knife blade 42 can be pivoted out of the transport position into the functional position or vice versa solely with the thumb due to the particularly good gripping option on the one hand and on the other hand, it is also possible to use the knife blade 42 even wearing a thick glove. This makes one-handed operation possible.

Implement 16 comprises the pivot bearing 21, a screwdriver 48 and a bottle opener 49.

As may be seen from FIGS. 1 and 3, the housing 2 additionally has a locking tab 50a in the end region 9 co-operating with the pivot bearing 20 of the knife blade 42 for locking and unlocking the knife blade 42 in the functional position and a locking tab 50b in the end region 10 co-operating with the pivot bearing 18 of the saw blade 24 for locking and unlocking the saw blade 24 in the functional position.

A particularly compact design of the pocket tool 1 is achieved if the locking tabs 50a, 50b are made integrally with the dividing wall 4a disposed between the saw blade 24 and the knife blade 42 by punching and shaping. The locking tabs 50a, 50b are angled downwards away from the plane of the dividing wall 4a in opposite directions so that the locking tab 50a, 50b is automatically moved out of the unlocked position, illustrated in FIG. 1, into the locked position, illustrated in FIG. 2, as the saw blade 24 or knife blade 42 is moved into the functional position. If a locking tab 50a, 50b is in the outwardly pivoted locked position and is subjected to an unlocking force opposing the action of the spring force in approximately the vertical direction towards the dividing wall 4a, it is moved laterally into the unlocked position next to the saw blade 24 or the knife blade 42, after which the saw blade 24 or the knife blade 42 can be pivoted out of the functional position into the transport position. To this end, the dividing wall 4a has wave-shaped parting lines 54 extending towards one another from oppositely disposed terminal side faces 52, spaced at a distance apart at their outwardly running ends by means of a transverse web 53.

The other implement 17 is provided in the form of a glass-shattering tool 55 or a cutting tool disposed on the pin 11b which can be replaced by means of the coupling mechanism 23 and has a centre tip 56 for breaking a glass pane.

The implements 13 to 17 described above are respectively mounted and spring-biased by means of the pivot bearing 18 to 21 against a spring element 60 to 63 projecting into the co-operating region 5, 6, 7 and can be pivoted out of the transport position illustrated in FIG. 1 by 180° into the functional position illustrated in FIG. 2.

Figure 9:
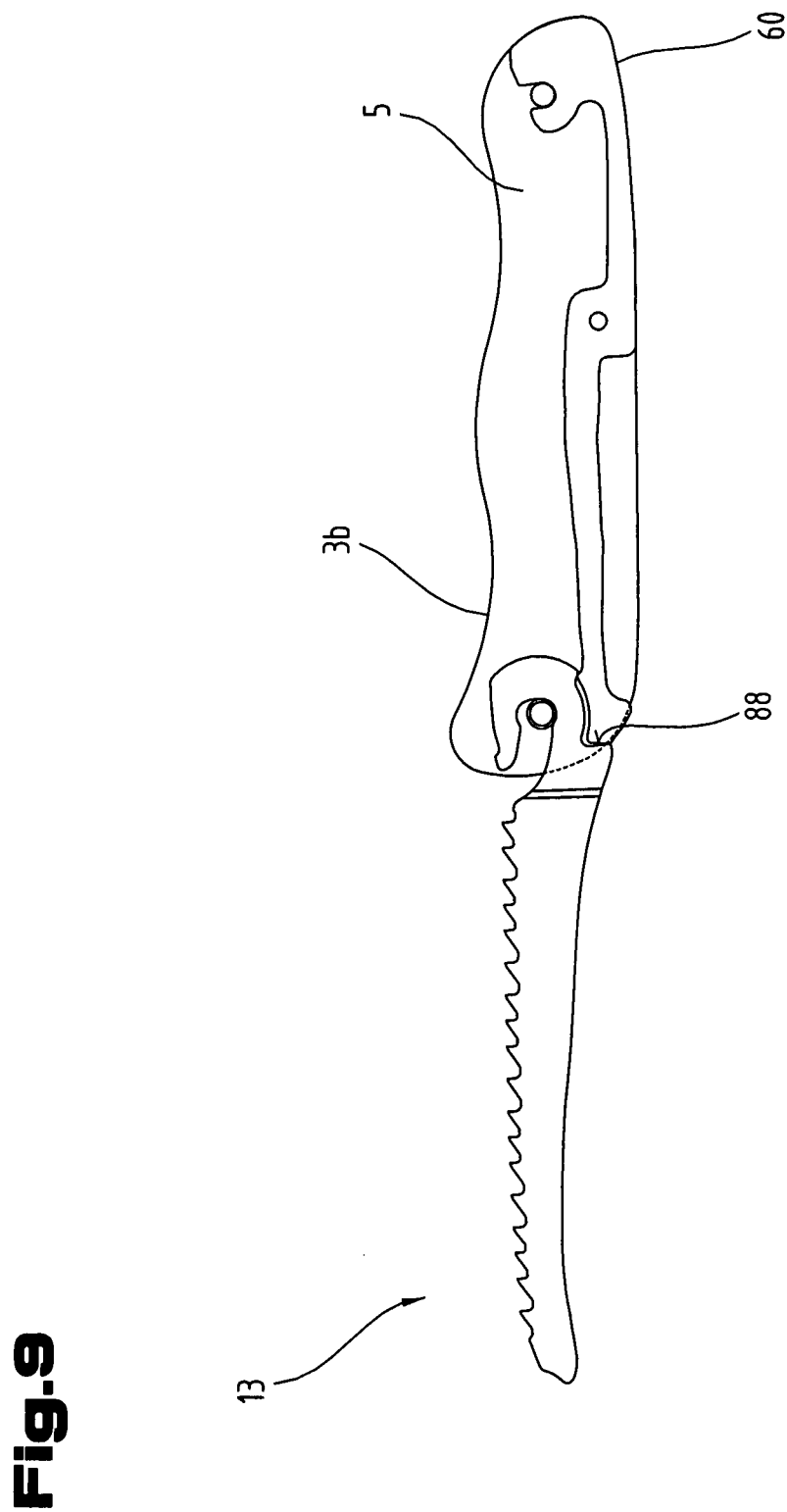
FIG. 9 is a side view of an implement pivoted out into the functional position and the spring element co-operating with it.

FIGS. 4 to 8, which will be described together, illustrate how the implement 13 is uncoupled from the pin 11a and provide detailed views of the implement 13 and the spring element 60. The cutting tool is pivotably mounted against the spring element 60 by means of its pivot bearing 18 so that a retaining force acts both in the inwardly pivoted transport position (FIG. 4) and in the outwardly pivoted functional position (FIG. 9). In order to prevent wear on the pin 11a even after frequent replacement operations, a bearing bush 58 may be provided on the latter, on which the cutting tool is mounted by means of its pivot bearing 18, in particular a bearing part. The spring element 60 is mounted by means of a lever and has a support body 64 mounted against the pin 11b and a flexibly elastic resilient arm 65 projecting out from the latter mounted so as to be rotatable about the pin 12. At its top face directed towards the cutting tool when pivoted in, the support body 64 forms a guide surface 66 and abutment stop 67 complementing the guide and abutment surface 31, which lie in a plane and together with a longitudinal axis 68 of the housing 2 subtend an angle of less than 30°, in particular between 10° and 20°.

As illustrated in the drawings, the side walls 3a, 3b are respectively provided with convex gripping cams 59 on their top face which project out from the external contour of the implement 13 once it has been pivoted into the transport position and are disposed symmetrically about the longitudinal axis 68, the height and width of which are dimensioned so that, in the uncoupling position, a partial length of the bottom edge 26 incorporating the blades 29 laterally overlaps with the side walls 3a, 3b.

Figure 5:
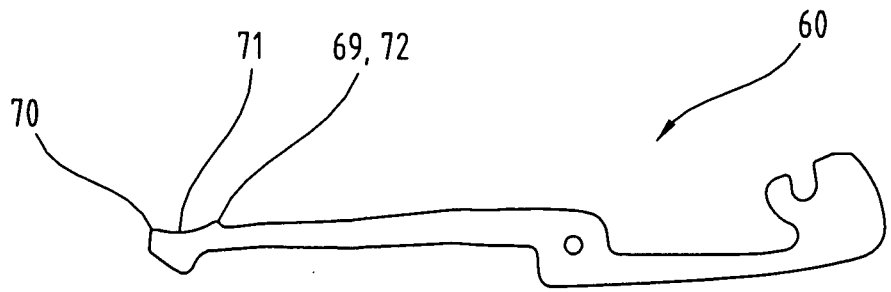
FIG. 5 is a side view of the spring element illustrated in FIG. 4.

The spring element 60 and the resilient arm 65 is provided at its free end with a catch cam 69, a support cam 70 and a concave guide link 71 extending between these in the longitudinal direction of the spring element 60, as indicated in FIG. 5. The catch cam 69 forms a catch element 72.

Figure 6:
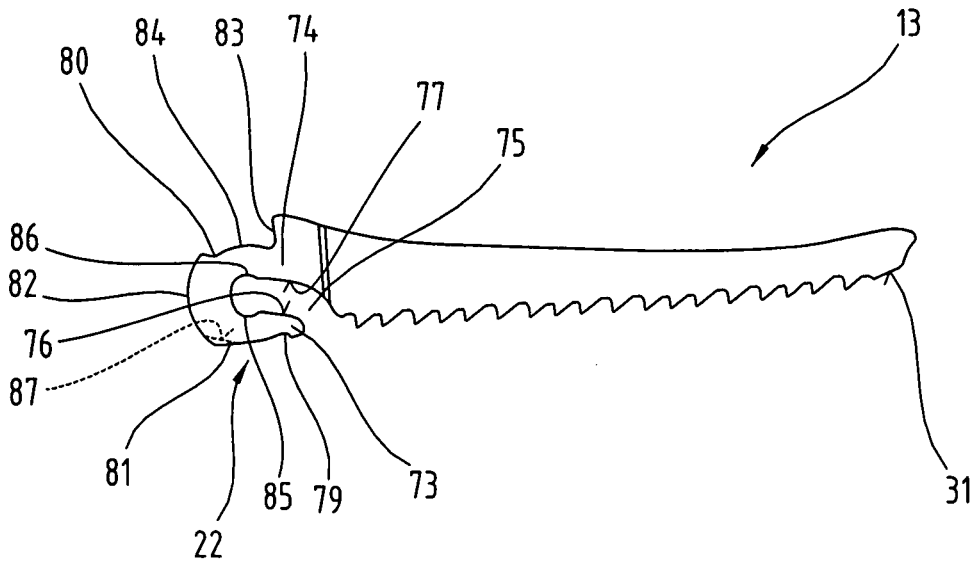
FIG. 6 shows the implement illustrated in FIG. 4 with a detailed view of its pivot bearing and coupling mechanism.

As illustrated in FIG. 6, the coupling mechanism 22 has guide arms 73, 74 and a recess 75 disposed between them for accommodating the pin 11a with bearing bush 58. The mutually facing sides of the guide arms 73, 74 respectively form a guide track 76, 77, and the angle subtended by the flat guide track 76 and the longitudinal axis 68 of the pocket tool 1 when the cutting tool is in the transport position is such that the cutting tool is pivoted into its uncoupling position between the inwardly pivoted transport position and the outwardly pivoted functional position illustrated in FIG. 7 at an angle 78 of less than 30°, in particular between 7° and 15°, with respect to the longitudinal axis 68 and can be uncoupled from the pin 11a, as illustrated in FIG. 7 and FIG. 8. This being the case, a longitudinal axis of the implement 13 and the guide track 76 subtend an angle of less than 30°, in particular between 7° and 15°, when the implement 13 is pivoted into the transport position.

The plate-shaped pivot bearing 18 has catch elements 79, 80 on the external periphery offset by approximately 180° in the pivoting direction, in which the catch cam 69 disposed on the spring element 60 latches when the saw blade 24 is in either the coupling position (FIG. 4) or the transport and functional position. This significantly improves the retaining forces in both the transport position and the functional position. Extending between the catch elements 79, 80 is a first and second guide track part 81, 82, and the guide track part 81 facing away from the guide arm 73 rests on the support cam 70 when the saw blade 24 is moved into the transport and coupling position. The catch element 79 is formed by a catch recess disposed in the first guide track part 81.

On the external periphery in the pivoting direction, the pivot bearing 18 also a shoulder 83, a third guide track part 84 extending from the catch element 80 as far as the shoulder 83 and facing away from the guide arm 74, as well as bearing parts 85, 86 disposed one above the other at the end of the recess 75. The catch element 80 is formed by a catch recess disposed in the third guide track part 84.

As indicated by broken lines in FIG. 6, the pivot bearing 18 may also be provided with a flat region 87 in the transition region between the guide track parts 81, 82, which extends approximately plane parallel with the first guide track 76 and enables the saw blade 24 to be retained in the uncoupling position with the flat region 87 lying against the support cam 70 and at an angle 78 relative to the housing 2.

In the transport and coupling position (FIG. 4), the saw blade 24 sits with its first guide track part 81 of the pivot bearing 18 on the support cam 71 of the spring element 60, and the catch elements 72, 79 of the spring element 60 and the pivot bearing 18 are mutually latched. Depending on the size of the support cam 70 and the degree of spring force, this produces an appropriate retaining force in the transport and coupling position. When the saw blade 24 is gripped and force is applied in order to overcome the retaining force so that the catch cam 69 is lifted out of the catch recess, the guide track part 82 runs on the outer end of the pivot bearing 18 due to the guide link 71. This guided sliding action causes a clean outward pivoting movement of the saw blade 24 relative to the spring element 60. Finally, the catch element 80 of the pivot bearing 18 reaches the catch cam 69 of the spring element 60, where it latches, and the saw blade 24 lies against the end face 88 of the spring element 60 due to the shoulder 83. The functional position (FIG. 9) is reached in this outwardly pivoted position, in which the saw blade 24 is locked by an appropriate retaining force of the spring element 60, which largely rules out any possibility of its inadvertently folding back during use.

In the uncoupling position (FIG. 7), a guide plane of the first guide track 76 and the longitudinal axis 68 extend virtually parallel with one another and the catch elements 72, 79 are moved out of engagement so that the blade 24 can be pushed against the action of the spring force in the direction of an extraction axis—indicated by arrow 90—relative to the pin 11a and the pin 11a releases the guide arm 73. During the uncoupling movement in the direction of the extraction axis 90, the saw blade 24 is advantageously guided vertically on the pin 11a by means of its first guide track 76 on the one hand and laterally by means of the housing 2, in particular on the side wall 3b and/or the spring element 60 and/or on a side face 39 of the belt cutter 35, on the other hand.

FIG. 10 illustrates how the saw blade 24 is coupled by means of the coupling mechanism 22 on the pin 11a. In the same way as the uncoupling operation, the coupling operation takes place under extremely safe conditions. When the saw blade 24 is being coupled, it is retained approximately parallel with the longitudinal axis 68 of the housing 2 and is pushed along the compartment region 5 in the direction of a retraction axis—indicated by arrow 91—relative to the pin 11a into the coupling position in which the pin 11a latches on the bearing part 85 and the catch elements 79, 80.

During the coupling movement of the saw blade 24 into the coupling position, the guide surface 31 sits on the guide surface 66 of the spring element 60 and slides and the pin 11a moves along the arcuate, second guide track 77 and pivot bearing 18 against the spring force of the spring element 60 as far as the bearing parts 85, 86, where the pivot bearing 18 latches by means of its bearing part 85 adjacent to the spring element 60 on the pin 11a due to the spring force.

As illustrated in the drawings, an opening side of the recess 75 faces the compartment region 5 in both the uncoupling position and the coupling position.

Figure 11:
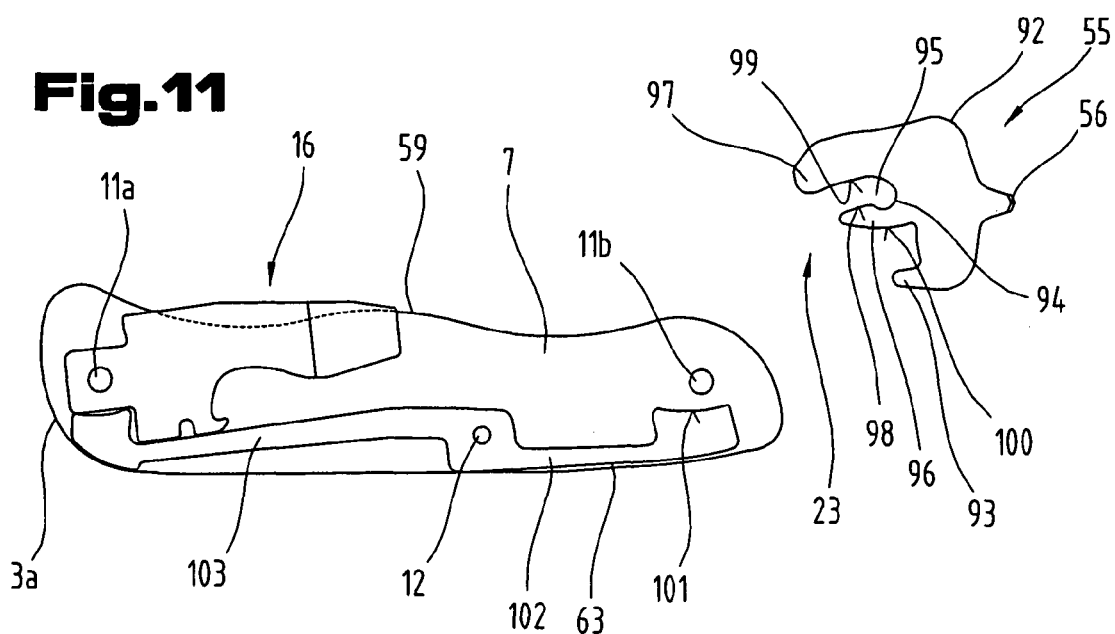
FIG. 11 is a side view showing the glass-shattering tool removed from the pin and the inwardly pivoted bottle opener, as well as the spring element co-operating with it.
Figure 12:
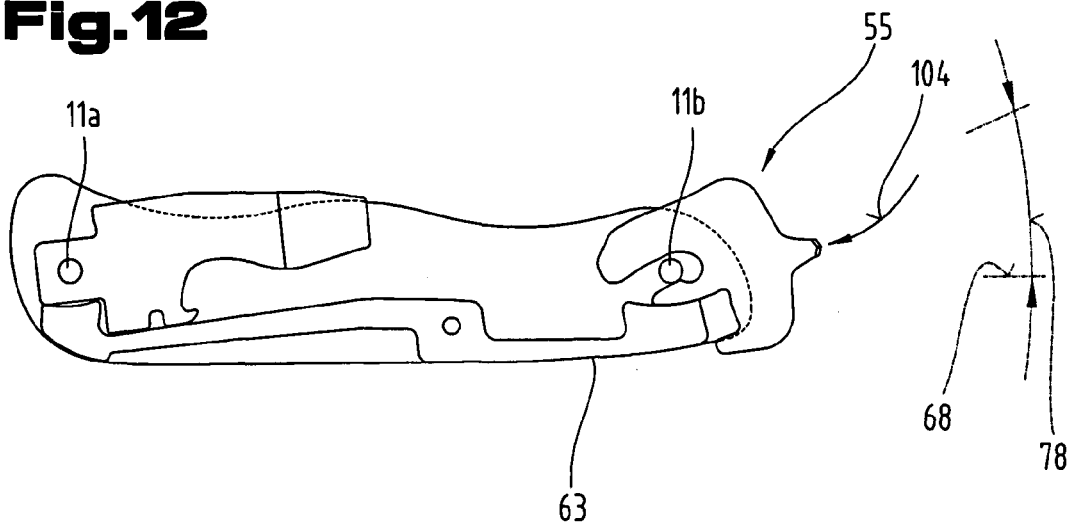
FIG. 12 is a side view of the glass-shattering tool during the coupling operation.
Figure 13:
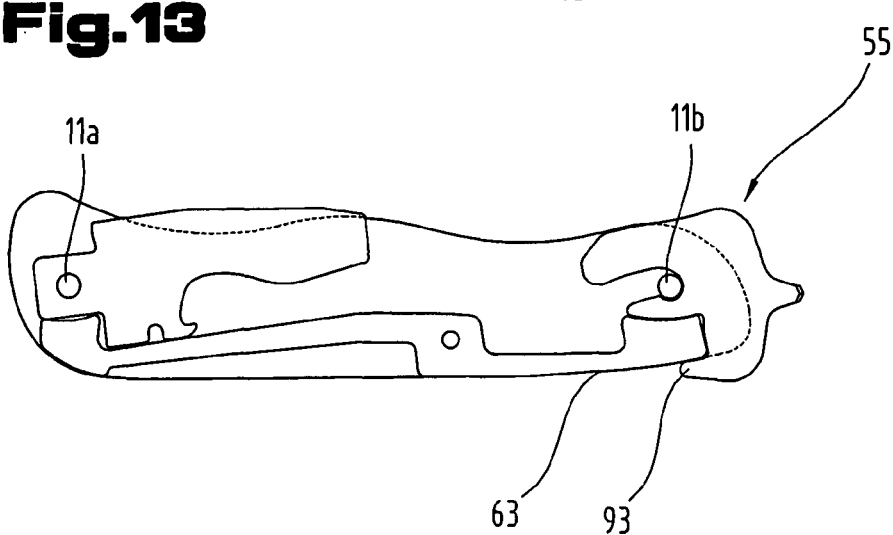
FIG. 13 is a side view showing the coupling position of the glass-shattering tool on the pin, the spring element and the bottle opener.

FIGS. 11 to 13, which will be described together, illustrate the consecutive steps involved in the operation of changing the glass-shattering tool 55 mounted on the pin 11b by means of the coupling mechanism 23. The glass-shattering tool 55 comprises a plate-shaped base body 92, the centre tip 56 provided thereon and the coupling mechanism 23 lying on the side opposite it, a locking lug 93 and a bearing part 94. The coupling mechanism 23 in turn has spaced apart guide arms 96, 97 above a recess 95 for accommodating the pin 11b. The guide arm 96 adjacent to the spring element 63 and the guide arm 97 lying opposite it each have a partially flat guide track 98, 99 on their mutually facing sides. The first guide arm 96 is additionally provided with an arcuate, third guide track 100 on the side facing the spring element 63, which is of a design complementing a guide track 101 on the spring element 63.

The spring element 63 has resilient arms 102, 103 mounted so as to be rotatable about the pin 12, the first resilient arm 102 co-operating with the glass-shattering tool 55 and the second resilient arm 103 co-operating with the implement 16, which are mounted so that they can be pivoted against the implement 16 on the one hand and against the glass-shattering tool 55 on the other hand, and the implement 16 is locked by means of a retaining force in both the inwardly pivoted transport position and the outwardly pivoted functional position.

When the glass-shattering tool 55 has to be coupled on the pin 11b, it is firstly positioned relative to the housing 2 so that the pin 11b is able to latch in the recess 95. During the coupling movement, the guide arm 96 is pivoted downwards against the action of the spring force of the spring element 63 about the pin 11b, as indicated by arrow 104 in FIG. 12. As this happens, the guide track 100 slides on the guide link 101 and the glass-shattering tool 55 is moved against the spring force of the spring element 63 as far as the bearing part 94, where the pin 11b latches in the bearing part 94, thereby reaching the coupling position (FIG. 13). In the coupling position, the guide arm 96 sits on the guide link 101 of the spring element 63 and the spring element 63 expends a corresponding retaining force on the glass-shattering tool 55.

The angle subtended by the guide track 98 and/or 99 with the longitudinal axis 68 of the pocket tool 1 is such that the glass-shattering tool 55 can be coupled on the pin 11b at an angle 78 of less than 30°, in particular between 7° and 15°, with respect to the longitudinal axis 68, as illustrated in FIG. 12 and FIG. 13. Accordingly, a longitudinal axis of the implement 17 and the guide track 98; 99 subtend an angle of less than 30°, in particular between 7° and 15°, when the implement 17 is coupled.

During the uncoupling operation, the glass-shattering tool 55 is gripped and a force applied in order to overcome the retaining force, so that the pin 11b is lifted out of the bearing part 94 and moved along the guide tracks 98, 99.

As illustrated in FIG. 13, the locking lug 93 extends behind the spring element 63 at the terminal end, so that the positive connection between the glass-shattering tool 55 and the spring element 63 during use prevents the pin 11b from being inadvertently lifted out of the bearing part 94 and the glass-shattering tool 55 from being uncoupled form the pin 11b.

Finally, it should be pointed out that the belt cutter 35 or the knife blade 42 may also be provided with a coupling mechanism.

For the sake of good order, it should finally be pointed out that, in order to provide a clearer understanding of the structure of the pocket tool 1, it and its constituent parts are illustrated to a certain degree out of scale and/or on an enlarged scale and/or on a reduced scale.

Above all, the individual embodiments illustrated in FIGS. 1 to 13 may be construed as independent solutions proposed by the invention.

LIST OF REFERENCE NUMBERS

| | |
|---|---|
| 1 | Pocket tool |
| 2 | Housing |
| 3a | Side wall |
| 3b | Side wall |
| 4a | Dividing wall |
| 4b | Dividing wall |
| 5 | Compartment region |
| 6 | Compartment region |
| 7 | Compartment region |
| 8a | Shell |
| 8b | Shell |
| 9 | End region |
| 10 | End region |
| 11a | Pin |
| 11b | Pin |
| 12 | Pin |
| 13 | Implement |
| 14 | Implement |
| 15 | Implement |
| 16 | Implement |
| 17 | Implement |
| 18 | Pivot bearing |
| 19 | Pivot bearing |
| 20 | Pivot bearing |
| 21 | Pivot bearing |
| 22 | Coupling mechanism |
| 23 | Coupling mechanism |
| 24 | Saw blade |
| 25 | Tip |
| 26 | Bottom edge |
| 27 | Top edge |
| 28 | Side face |
| 29 | Blade |
| 30 | Grip element |
| 31 | Guide and abutment surface |
| 35 | Belt cutter |
| 36 | Tip |
| 37 | Bottom edge |
| 38 | Top edge |
| 39 | Side face |
| 40 | Blade |
| 41 | Grip element |
| 42 | Knife blade |
| 43 | Bottom edge |
| 44 | Top edge |
| 45 | Side face |
| 46 | Blade |
| 47 | Grip orifice |
| 48 | Screwdriver |
| 49 | Bottle opener |
| 50a | Locking tab |
| 50b | Locking tab |
| 52 | Terminal side face |
| 53 | Transverse web |
| 54 | Parting line |
| 55 | Glass-shattering tool |
| 56 | Centre tip |
| 58 | Bearing bush |
| 59 | Gripping cam |
| 60 | Spring element |
| 61 | Spring element |
| 62 | Spring element |
| 63 | Spring element |
| 64 | Support body |
| 65 | Resilient arm |
| 66 | Guide surface |
| 67 | Abutment stop |
| 68 | Longitudinal axis |
| 69 | Catch cam |
| 70 | Support cam |
| 71 | Guide link |
| 72 | Catch element |
| 73 | Guide arm |
| 74 | Guide arm |
| 75 | Recess |
| 76 | Guide track |
| 77 | Guide track |
| 78 | Angle |
| 79 | Catch element |
| 80 | Catch element |
| 81 | Guide track part |
| 82 | Guide track part |
| 83 | Shoulder |
| 84 | Guide track part |
| 85 | Bearing part |
| 86 | Bearing part |
| 87 | Flat region |
| 88 | End face |
| 90 | Extraction axis |
| 91 | Retraction axis |
| 92 | Base body |
| 93 | Locking lug |
| 94 | Bearing part |
| 95 | Recess |
| 96 | Guide arm |

-continued

| | |
|---|---|
| 97 | Guide arm |
| 98 | Guide track |
| 99 | Guide track |
| 100 | Guide track |
| 101 | Guide link |
| 102 | Resilient arm |
| 103 | Resilient arm |
| 104 | Arrow |
| 105 | Cam |
| 106 | Deflector surface |
| 107 | Guide surface |
| 108 | Support surface |
| 109 | Gripping surface |

What is claimed is:

1. A pocket tool, comprising:
a housing with at least one compartment region;
a first pin and a second pin disposed in the housing;
a spring element disposed in the housing and having a catch cam and a support cam and a concave guide surface extending between the cams at a first end and a second guide surface at its second end opposite to the first end;
a cutting tool having a first end, a second end, a bottom edge, a pivot bearing having a coupling mechanism arranged in the first end with first and second bearing parts and catch elements that engage with the cams and the concave guide surface of the spring element and a tip with an abutment surface arranged in the second end, said bottom edge having one or more cutting edges extending between the pivot bearing and the tip;
wherein the coupling mechanism has a first and second guide arm and a recess disposed between the guide arms for accommodating the first pin, wherein the first guide arm forms a first track with a flat portion and the second guide arm forms a second guide track and where the first bearing part is recessed into the first guide track and the second bearing part is recessed into the second guide track, the flat portion extending from the first bearing to the end of the first guide arm;
wherein the cutting tool is displaceably mounted on the first pin by means of the pivot bearing and the spring element such that the cutting tool is movable between a transport position, wherein the cutting tool is held inside the compartment region, and a functional position, wherein the cutting tool is held outside the compartment region, and an uncoupling position, between the transport and functional positions, where the cutting tool extends at an angle of less than 30 degrees with respect to the longitudinal axis of the housing;
wherein when the cutting tool is in the transport position, the coupling mechanism is held in place by a retaining force exerted by the spring element with the first bearing part against the first pin, and wherein when the cutting tool is in the functional position, the coupling mechanism is held in place by a retaining force exerted by the spring element with the second bearing part held against the first pin, and
wherein in the uncoupling position, the catch elements are moved out of engagement with the cams and the flat portion of the first guide track extends substantially parallel with the longitudinal axis of the housing, so that during an uncoupling movement of the tool along the length of the housing at an angle of less than 30 degrees with respect to the longitudinal axis of the housing against the spring force disengages the first pin from the bearing parts and the coupling mechanism is configured to guide the cutting tool by means of the engagement of the flat portion and first pin in such a way that the tip of the cutting tool protrudes out beyond the external contour of the housing to remove the cutting tool from the pocket knife;
wherein the coupling mechanism is further configured to guide the cutting tool during a coupling movement along the compartment region at the first end relative to the first pin by means of the second guide track, whereby during the coupling movement the cutting tool is further guided at the second end by means of the abutment surface on the tip of the cutting tool and the second guide surface of the spring element in such a way that the abutment surface of the cutting tool engagingly slides on the second guide surface of the spring element; and
wherein during the coupling movement the cutting tool is retained approximately parallel to the longitudinal axis of the housing.

2. The pocket tool as claimed in claim 1, wherein the second guide track is configured to move the cutting tool into the coupling position during the uncoupling movement relative to the first pin along the compartment region, wherein the second guide surface is a concavely extending surface facing the first guide arm.

3. The pocket tool as claimed in claim 1, wherein the first and second bearing parts are disposed one above the other at a distance apart with respect to the longitudinal axis of the recess.

4. The pocket tool as claimed in claim 1, wherein one of the catch elements of the coupling mechanism is provided in the form of a catch recess disposed in the first guide arm.

5. The pocket tool as claimed in claim 4, wherein the catch cam complements the catch recess.

6. The pocket tool as claimed in claim 1, wherein the cutting tool has a shoulder in the region of the pivot bearing which lies against the end face of the spring element in the outwardly pivoted functional position.

7. The pocket tool of claim 2, further comprising:
a second compartment region in the housing;
a third compartment region in the housing;
a first implement displaceably mounted on the first pin, wherein the first implement is movable between a transport position, wherein the first implement is inside the second compartment region, and a functional position, wherein the first implement is outside the second compartment region;
a second implement displaceably mounted on the second pin, wherein the second implement is movable between a transport position, wherein the second implement is inside the third compartment region, and a functional position, wherein the second implement is outside the third compartment region; and
a dividing wall between the second compartment region and the third compartmept region, the dividing wall having locking tabs projecting out in opposite directions, the locking tabs being configured to lock and unlock the first and second implements, respectively, from their functional positions.

8. The pocket knife as claimed in claim 1, wherein the housing has oppositely lying side walls, the side walls having top face convex gripping cams disposed symmetrically about the longitudinal axis of the housing and projecting out beyond the external contour of the cutting tool when the cutting tool is in the transport position, wherein the geometry of the gripping cams is dimensioned so that, in the cutting tool's uncoupling position between the transport position and the functional position, a partial length of the bottom edge of the cutting tool lies within the compartment region covered by the side walls.

* * * * *